July 26, 1938.  W. W. ROBINSON  2,124,633
THERMOSTAT
Filed June 20, 1936
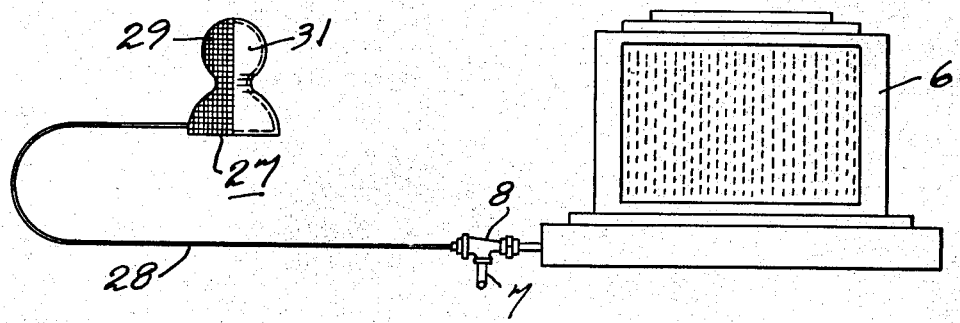
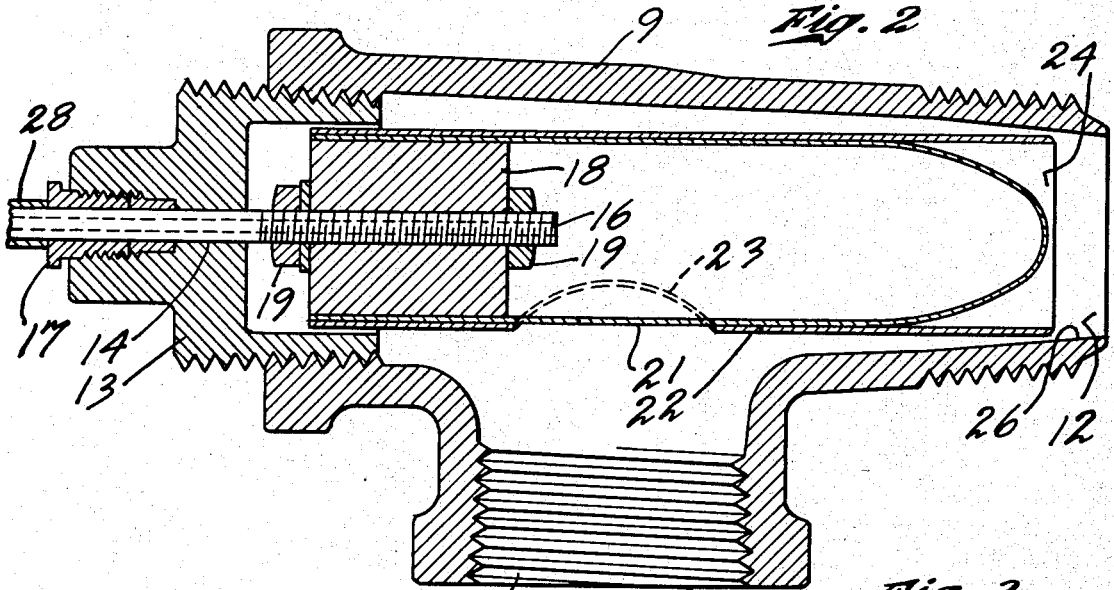
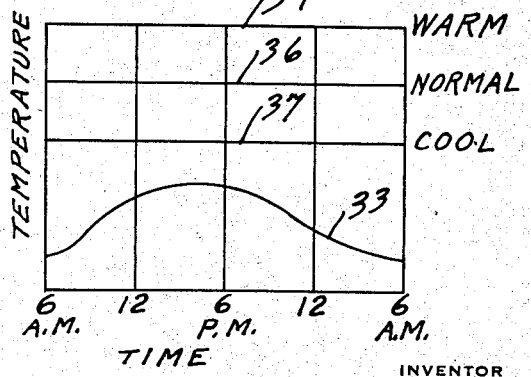
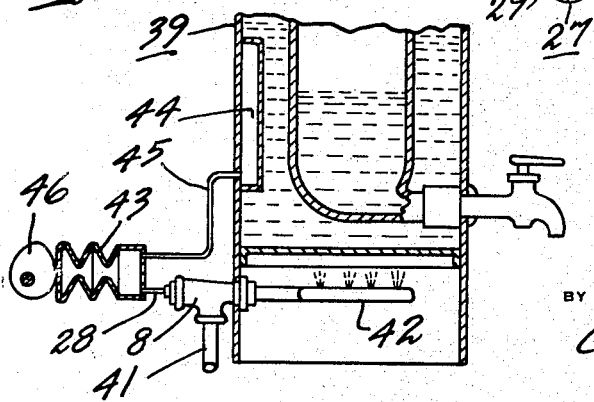
INVENTOR
W. W. Robinson
BY Charles H. Bassett
ATTORNEY Patented July 26, 1938

2,124,633

UNITED STATES PATENT OFFICE 2,124,633

THERMOSTAT

Walter W. Robinson, Anniston, Ala.

Application June 20, 1936, Serial No. 86,283

3 Claims. (Cl. 236—99)

My invention relates to thermostats and more particularly to a device of this kind adapted for use with gas-heated devices such as radiant heaters, coffee urns, and the like; and contemplates the provision of a regulator which acts to maintain a room or other object being heated at a predetermined, constant temperature.

My invention further contemplates the provision of a device of this kind embodying means by which the temperature of the object being heated may readily be varied to suit the desires of the operator, and then maintained constantly at the chosen point until manually re-set at a different temperature.

My invention further contemplates the provision of a valve embodying means responsive to air pressure for controlling a flow of gas to the heating unit, together with means positioned remote from the valve for controlling the operation of same.

Briefly, my invention comprises a valve body which is interposed in the gas intake line of a heating unit. Positioned within the valve body, I provide a cylinder having a gas inlet and outlet, and housing a flexible bag member adapted to be inflated and deflated to control the passage of gas through the cylinder inlet. An air container is adapted to be positioned remote from the valve and provided with an air line extending to the flexible bag member for the purpose of inflating and deflating same. When the air pressure within the air container increases, it acts to inflate the flexible bag member and thereby reduce the gas flow; and when the pressure drops in the air container, the bag member is deflated to permit a greater flow of gas through the valve. The valve is provided with a by-pass for the gas to prevent a complete cut-off when the bag member is inflated.

My invention embodies other novel features, details of construction, and arrangement of parts which are hereinafter set forth in the specification and claims and shown in the drawing, forming part thereof.

Apparatus embodying features of my invention is illustrated in the accompanying drawing, wherein:

Fig. 1 is a front elevational view of one form of my improved control apparatus applied to a radiant gas heater;

Fig. 2 is a longitudinal sectional view showing the construction of my improved valve for controlling the flow of gas to the heating unit;

Fig. 3 is a view of a graphic diagram which shows the function of the control apparatus; and Fig. 4 is a sectional view showing a modified form of my invention in which the heat control apparatus is applied to a coffee urn.

Referring now to the drawing and more particularly to Figs. 1, 2, and 3 therein, I show my improved temperature control apparatus applied to a radiant gas heater 6 to maintain a constant temperature within a room. Interposed in the gas inlet line 7 is provided a valve 8 which controls the flow of gas to the heater. The valve comprises a body portion 9 having an inlet 11 and outlet 12 for connection with the gas line 7. A plug 13 is threaded into one end of the valve body and is formed with an aperture 14 to receive an air tube 16 which is held in position by means of a stuffing box plug 17.

A filler plug 18 is secured in position on the inner end of the air tube 16 by means of a pair of nuts 19 and serves to close the open end of a flexible bag-shaped member 21. A tube member 22 is provided to enclose the flexible member 21 and to seal the open end of the flexible member against the filler plug 18. The tube member is formed with an inlet 23 and an outlet 24 through which openings gas is adapted to pass to the heater when permitted to do so by the flexible member. The outer end of the tube member and the inner tapered wall 26 of the valve body define a by-pass outlet for the gas when the flexible member prevents a flow of gas through the tube member, in order that a pilot light may be maintained at all times.

An air container 27 is connected to the air tube 16 leading to the interior of the flexible member by means of an air conduit 28 which is preferably formed of flexible material to permit the free movement of the air container to various positions with respect to the heater. While the container 27 may be formed in any suitable shape, it is preferably formed round when employed with a radiant gas heater and having half of its outer surface blackened as at 29 to provide a heat absorbing surface while the other half of the container surface is left with a polished metallic finish to reflect heat.

In the operation of the apparatus above described, the air container is preferably positioned a few feet in front of the heater and in the direction of radiation, as illustrated in Fig. 3. When the container is thus positioned to control the operation of the valve 8, the heat radiated from the heater acts to build up an air pressure within the container and the flexible member 21 until a state of equilibrium is reached between the temperature of the room and the volume of gas passing through the valve.

When a state of equilibrium has thus been reached, a lowering of temperature in the room causes the air pressure in the container to fall and permits a greater volume of gas to pass through the tube member 22 due to the deflation of the flexible bag member. The heat radiated from the heater will thus be greater due to the increase in gas volume and acts instantly to build up the pressure in the container until the state of equilibrium has again been reached. A rise in room temperature causes a rise in air pressure in the container 27 and thereby inflates the flexible member in the valve to lower the volume of gas passing to the heater. In actual practice, it has been found that this control apparatus is capable of maintaining the temperature of a room within a variance of two degrees from a predetermined constant temperature due to its instant reaction to any change in temperature.

When a higher constant temperature is desired, the heat reflecting surface 31 of the air container is presented to the heater, thereby causing the air pressure to fall and permit more gas to flow through the valve 8 to the heater; and when a lower constant temperature is desired, the heat absorbing surface 29 is presented to the front of the heater to increase the pressure within the container and thereby inflate the flexible member 21 to decrease the gas supply. The constant temperature of the room may also be raised or lowered by moving the air container closer to or farther from the heater, thereby either increasing or decreasing the air pressure in the container to control the supply of gas passing through the valve.

In Fig. 3, the line 33 represents the normal rise and fall in the uncontrolled temperature throughout a period of twenty-four hours; while the lines 34, 36, and 37 represent the various changes of constant temperature arrived at by merely turning the air container with respect to the direction of radiation.

In Fig. 4 in the drawing I show a modified form of my invention applied to a coffee urn 39. In this form of my invention, the valve 8 is interposed in the gas line 41 leading to the burner 42 and the air conduit 28 leads to a variable size air container 43. Another conduit 45 leads from the container 43 to an air container 44 positioned inside the coffee urn. The operation of this apparatus is the same as that already described except that a change in the constant temperature is affected by manually rotating the cam member 46 to vary the size of the container 43 and thereby increase or decrease the air pressure within the system.

It will thus be seen that I have invented an improved temperature control apparatus which may readily be adapted for use with many different types of gas-heated devices in which it is desirable to quickly arrive at a predetermined temperature and to maintain said temperature constant for a considerable length of time.

While I have shown my invention in but two forms, it is obvious to those skilled in the art that it is not so limited, but is susceptible of various changes and modifications without departing from the spirit thereof; and I desire therefore that only such limitations shall be placed thereupon as are imposed by the prior art.

I claim:

1. In a temperature regulator for gas-heated devices having a gas inlet, a valve body interposed in the gas inlet, a valve cylinder mounted in said valve body and provided with means defining an inlet and outlet for the passage of gas, a flexible bag member disposed within said valve cylinder, means for inflating and deflating said bag member to control the passage of gas through said valve cylinder, a by-pass opening for the passage of gas provided between the valve body and the valve cylinder, and means for moving the valve cylinder with respect to the valve body to regulate the by-pass opening.

2. A device according to claim 1 in which the flexible bag member is elongated in form and extends substantially the length of the valve cylinder.

3. A device according to claim 1 in which, the means for inflating and deflating the flexible bag member to control the passage of gas through the valve cylinder comprises a fluid container disposed adjacent the device being heated.

WALTER W. ROBINSON.